Feb. 15, 1966 J. W. HACKETT 3,235,352
GLASS FORMING APPARATUS
Filed Oct. 9, 1961 11 Sheets-Sheet 11
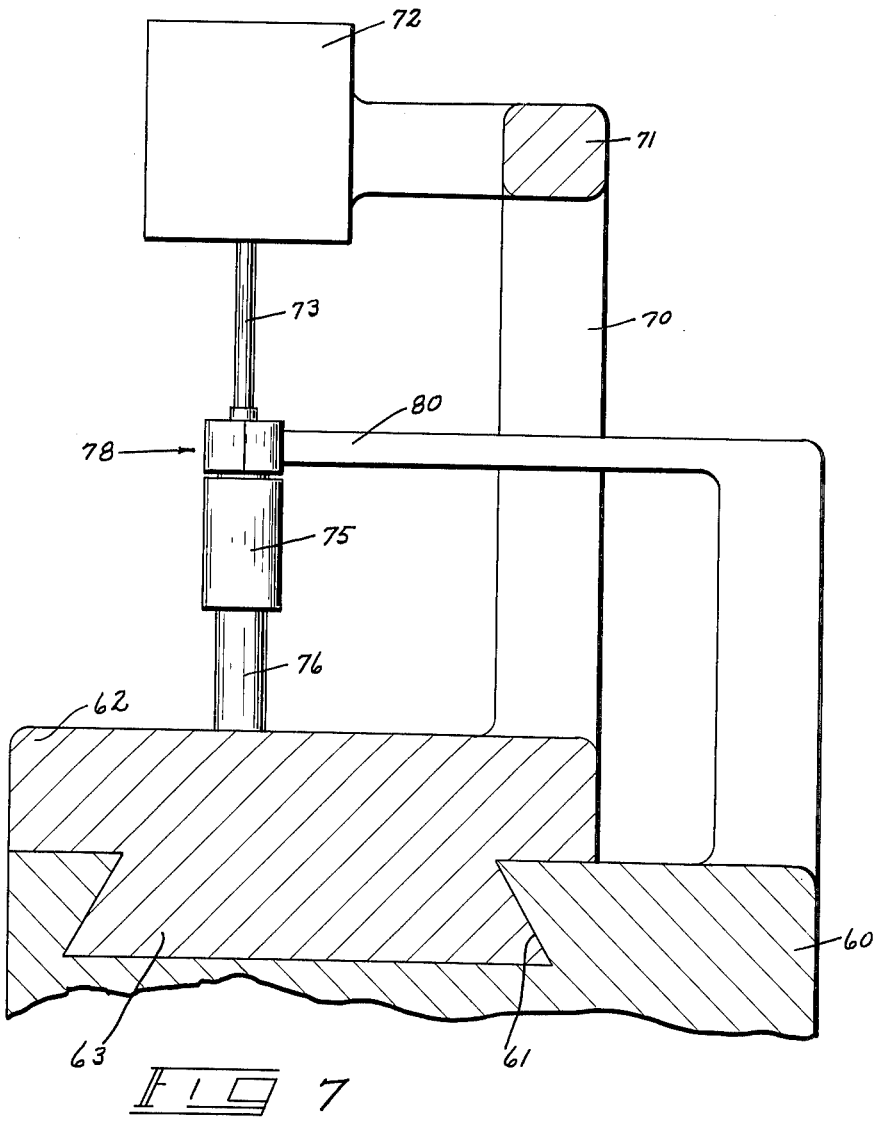
F I G 7
INVENTOR.
James W. Hackett
BY W. A. Schaich +
D. T. Innis
ATTORNEYS United States Patent Office 3,235,352
Patented Feb. 15, 1966

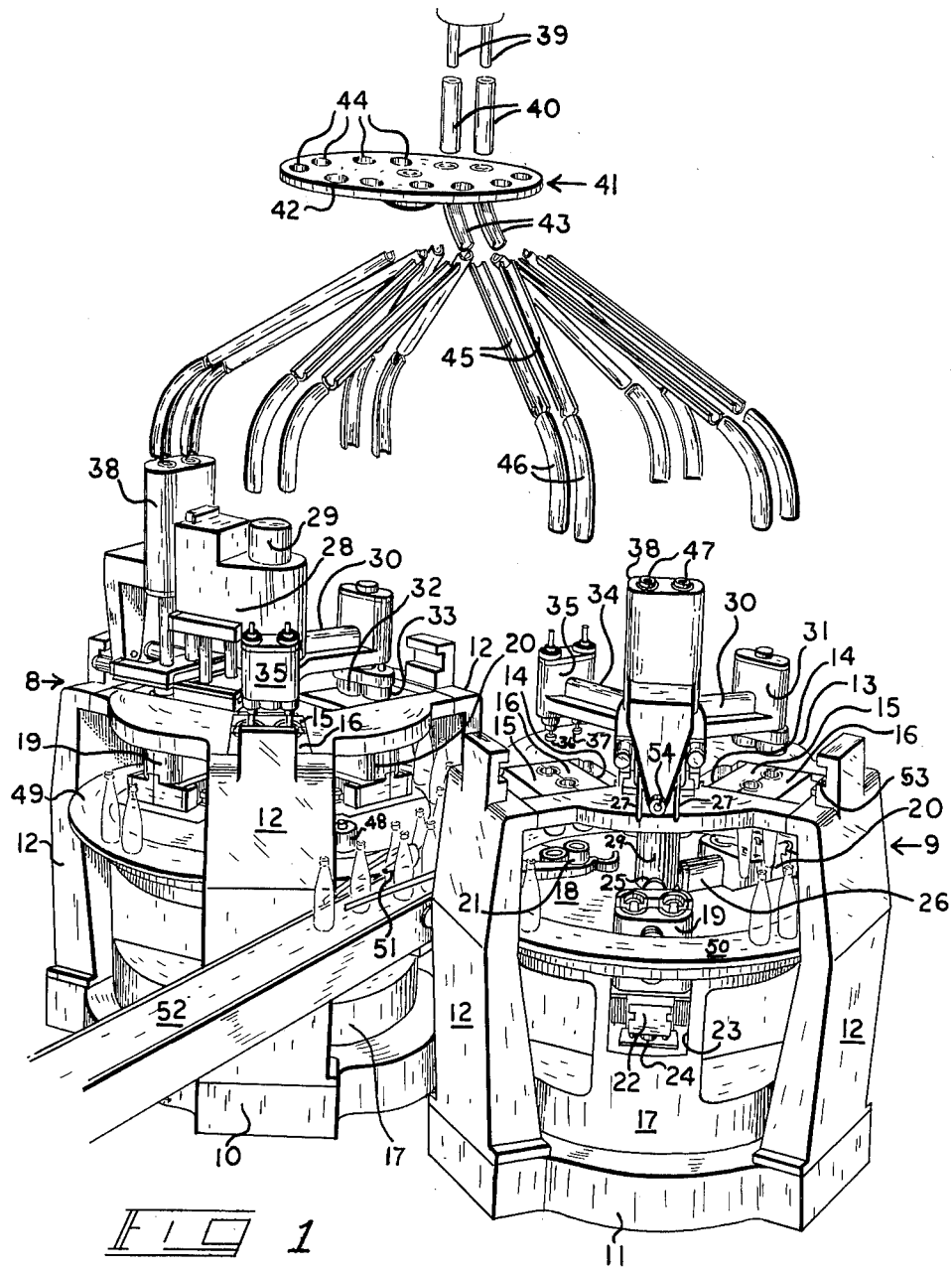

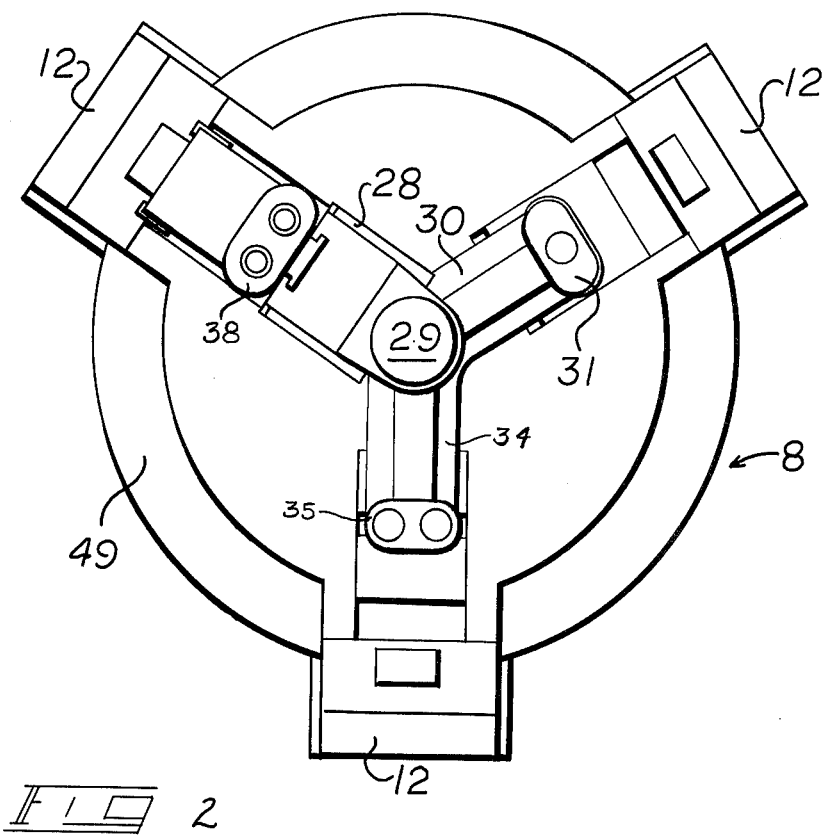

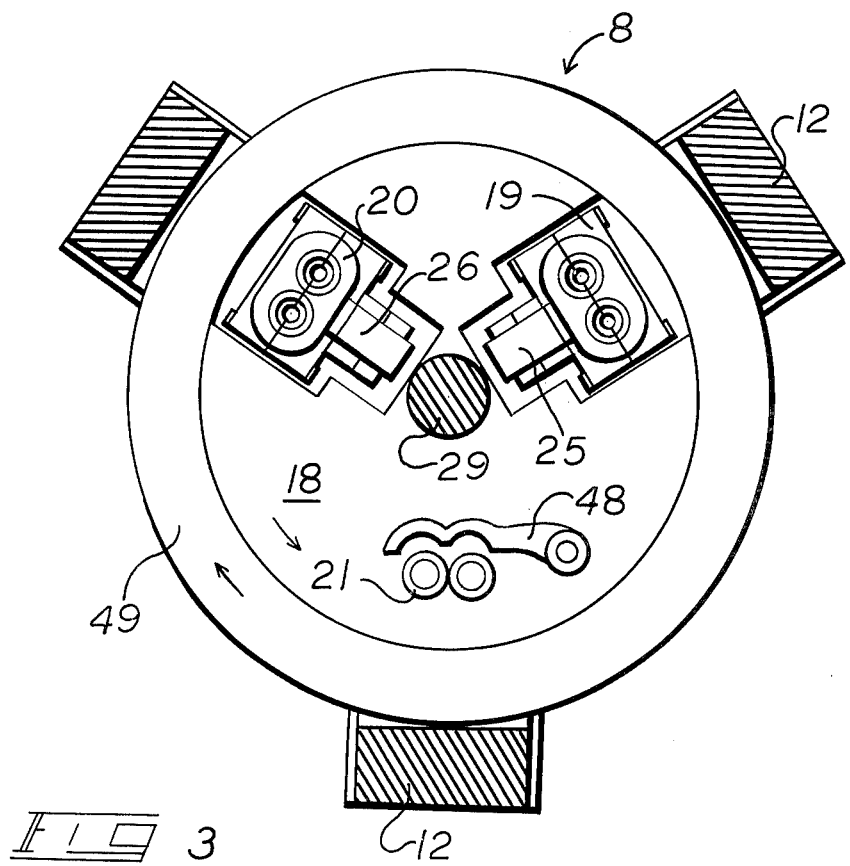

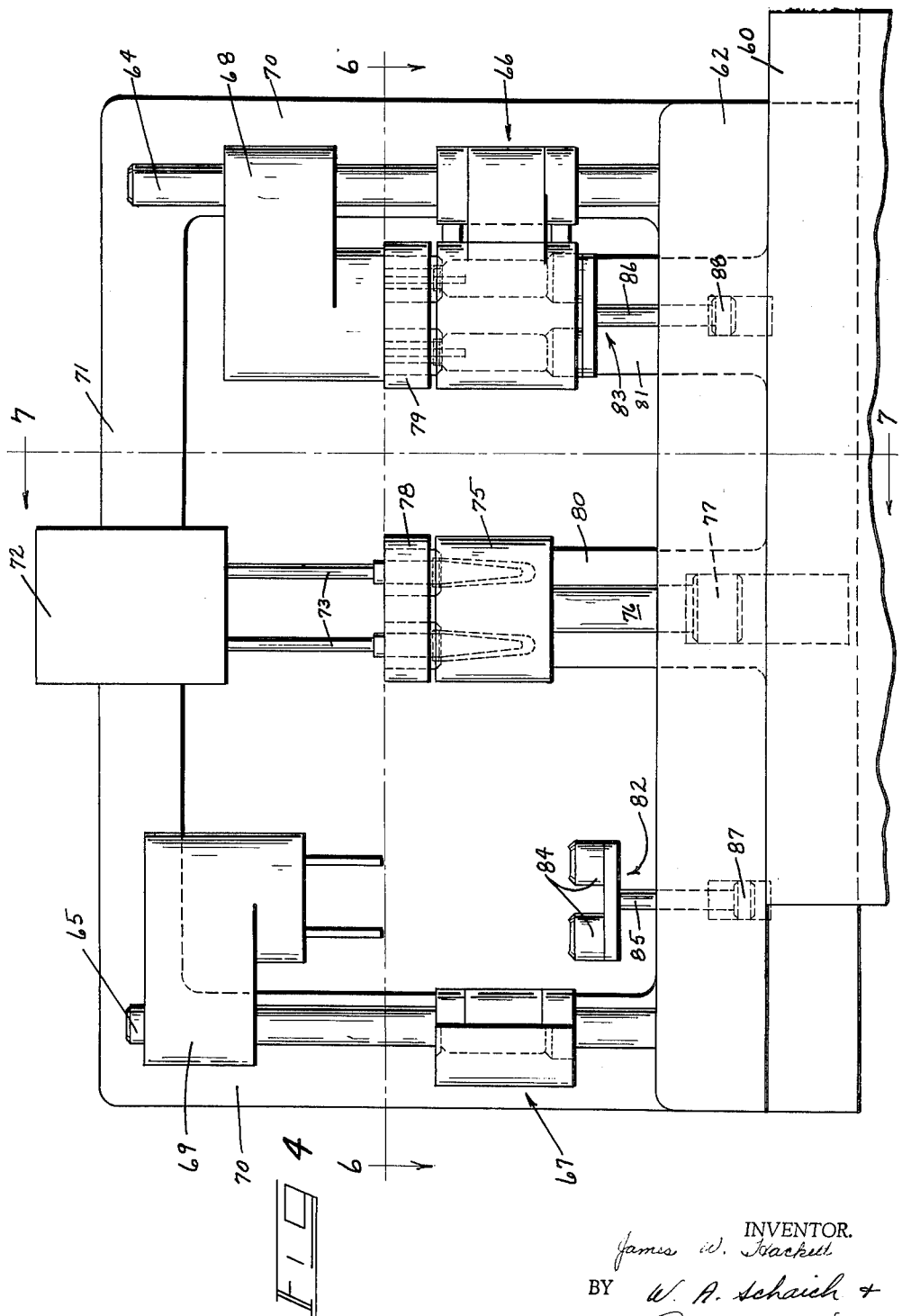

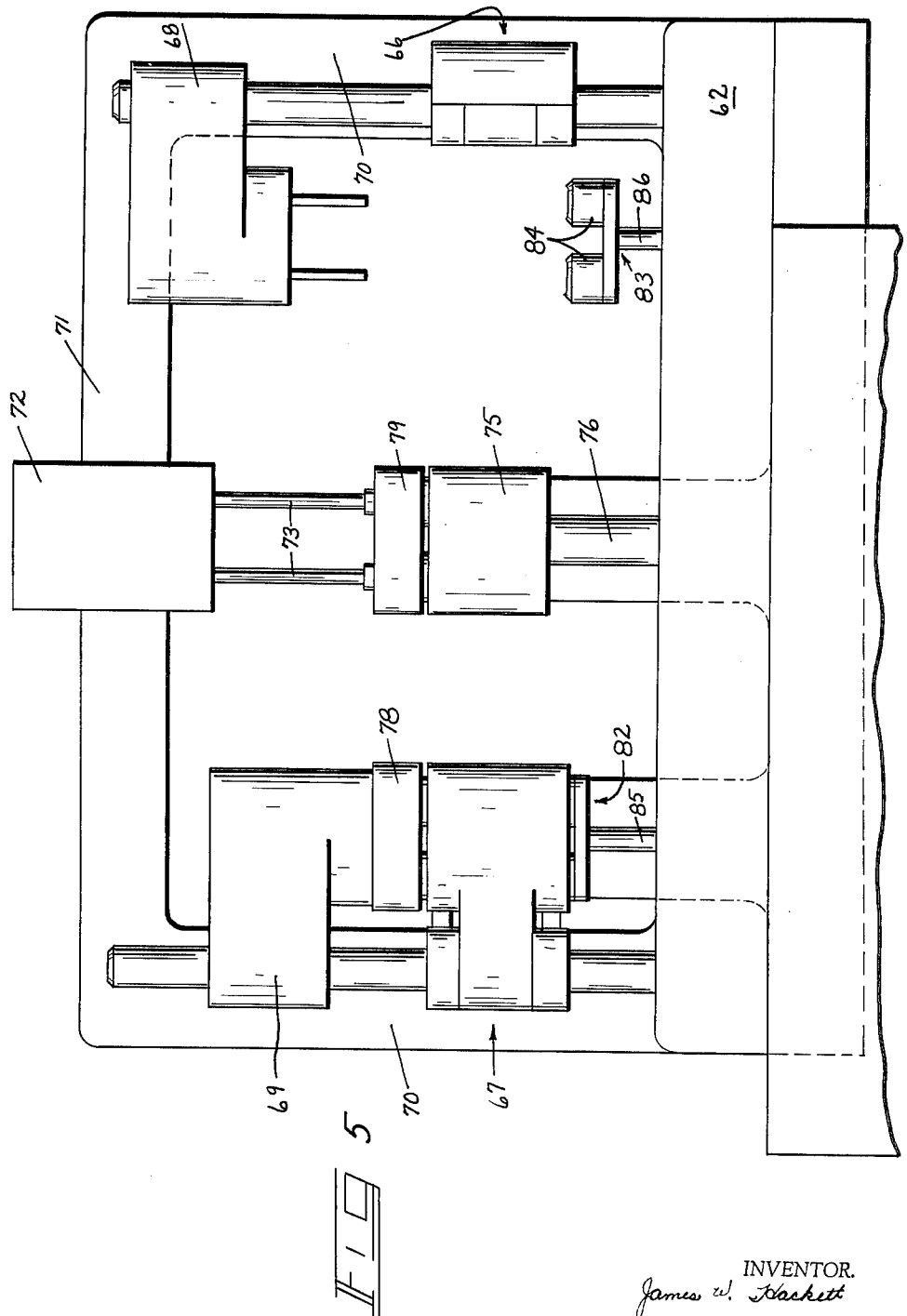

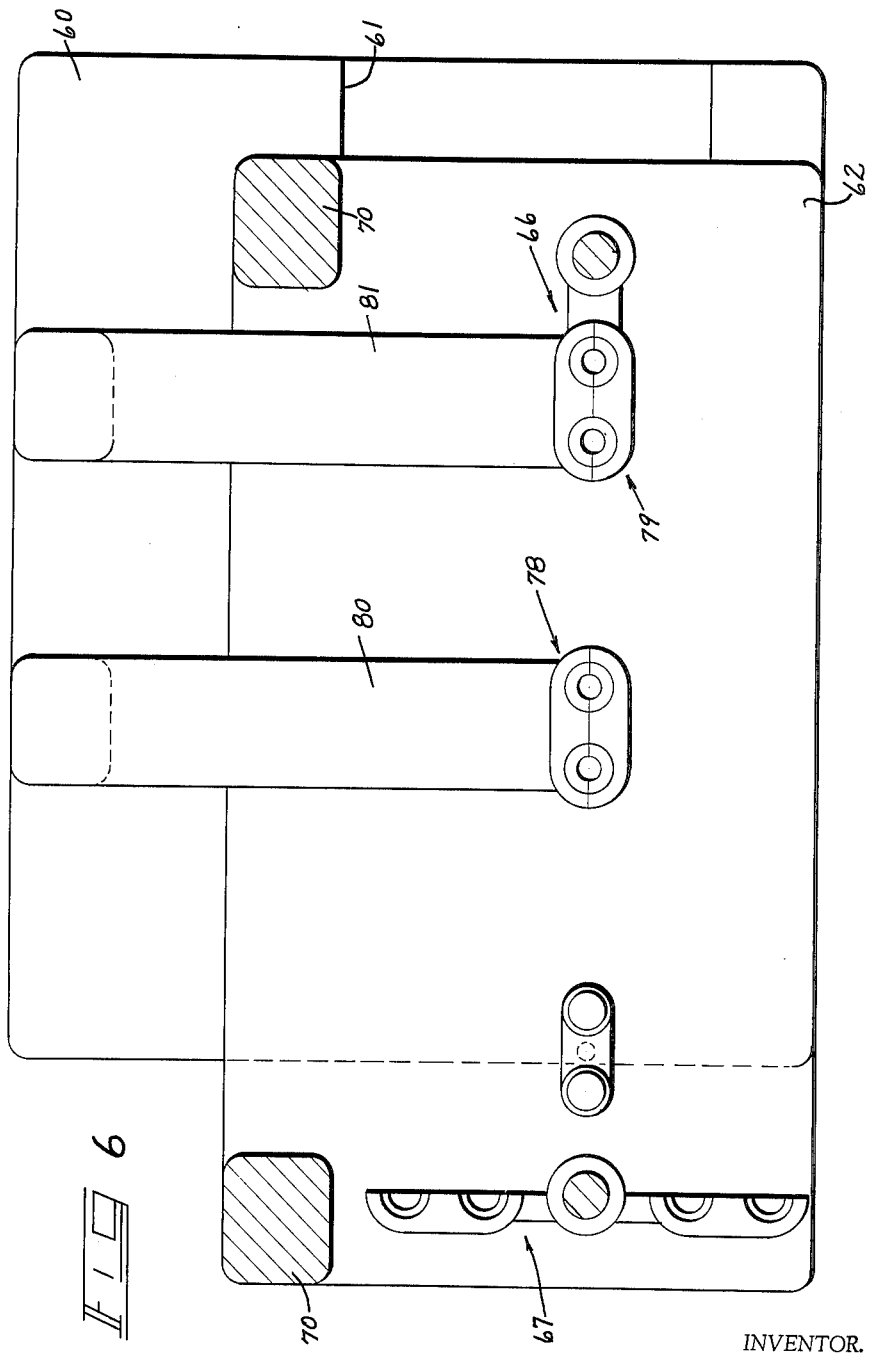

3,235,352
GLASS FORMING APPARATUS
James W. Hackett, Sylvania, Ohio, assignor to Owens-Illinois Glass Company, a corporation of Ohio
Filed Oct. 9, 1961, Ser. No. 143,874
8 Claims. (Cl. 65—238)

This invention relates to method and apparatus for forming hollow glass articles, and in particular to forming glass bottles. More particularly, this invention relates to a method and apparatus for forming blown bottles in which the glass is fed to the machine in the form of mold charges and the mold charges are pressed and blown without transfer of the glass from the position to which the mold charges have been fed.

It has been the practice in the past to form glassware by feeding mold charges to a parison forming mold and after forming the parison, transferring the parison from the location where it was performed to a blow molding unit where it is expanded to its final form.

With the above procedure, it is obvious that it is necessary to move the parison while it is in a relatively plastic state and with the ever-increasing speeds of operation of forming machines, there is a serious speed limitation in that it is impossible to transfer at high rates without distorting the parison. As forming operations have become more and more refined, one of the limiting factors in the speed of production has been this inability to move the parisons from the parison forming unit to the blow molding unit without causing defects to appear in the finished ware.

With the foregoing in mind, it is an object of this invention to provide apparatus for forming hollow glass articles in which the glass article is completely formed at one station.

It is an additional object of this invention to provide a method of forming blown glass articles wherein all the forming steps are carried out while the glass is retained in a single location.

It is a further object of this invention to provide a method and apparatus for forming glass articles wherein an overlap cycle of operation is employed and the glass is not subjected to centrifugal stresses during the forming cycle.

It is a still further object of this invention to provide a method and apparatus for forming glass articles in which the glass is retained within neck forming molds and the various forming steps and mechanism for accomplishing these steps are carried out with the glass retained within stationary neck molds.

Other and further objects and advantages will be apparent when taken in conjunction with the annexed sheets of drawings wherein:

FIG. 1 is a perspective view of two machines of the invention;

FIG. 2 is a top plan view on an enlarged scale of the left-hand machine of FIG. 1;

FIG. 3 is a plan view on an enlarged scale of the mold carrying table of the left-hand machine of FIG. 1;

FIG. 4 is a schematic elevational view of a second embodiment of the invention;

FIG. 5 is a schematic elevational view of the second embodiment with the forming mechanism shifted to its alternate position;

FIG. 6 is a cross-sectional view taken on the line 6—6 of FIG. 4; and

FIG. 7 is a cross-sectional view taken at line 7—7 on FIG. 4.

Figure 2A:
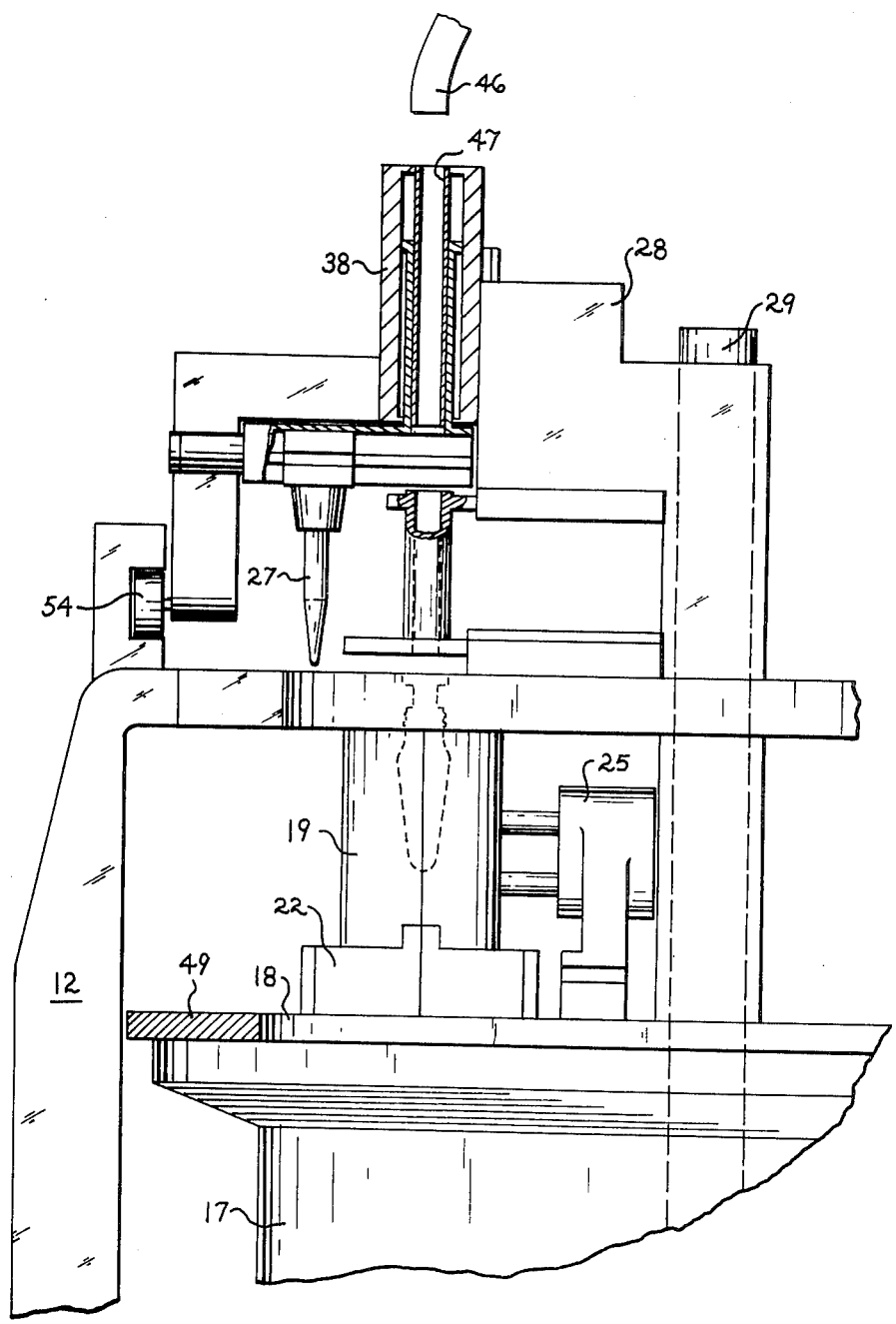
FIG. 2a is a partial elevational view of the parison forming mechanism of the left-hand machine illustrated in FIG. 1.

Referring now to the drawings and in particular to FIG. 1, there is shown a pair of forming machines, generally designated 8 and 9, which embody the invention. These forming machines have bases 10 and 11. Connected to the bases and extending vertically upward therefrom are neck ring supporting members 12 of which there are three for each machine. These supports 12 are connected together at their upper ends by a heavy disc-like member 13. The member 13 has three circumferentially spaced cut outs 14 formed therein within which split neck molds 15 and 16 are mounted for horizontal relative motion. These bases 10 and 11 also support generally circular drum-like members 17 for rotation with respect thereto. The members 17 have flat, horizontal upper surfaces 18 which serve as mold carrying tables. The drum-like member 17 in the forming machine 9 is mounted for rotation in a clockwise direction with respect to its base 11 and carries, within circumferentially spaced recesses formed therein, a split parison mold 19, a split blow mold 20 and a jar lowering mechanism 21. The machine 9, as best shown with reference to FIGS. 1 and 3 has a split parison mold 19 mounted for vertical reciprocation with respect to the neck molds 15 and 16 by suitable hydraulic mechanism positioned thereunder.

Figure 2B:
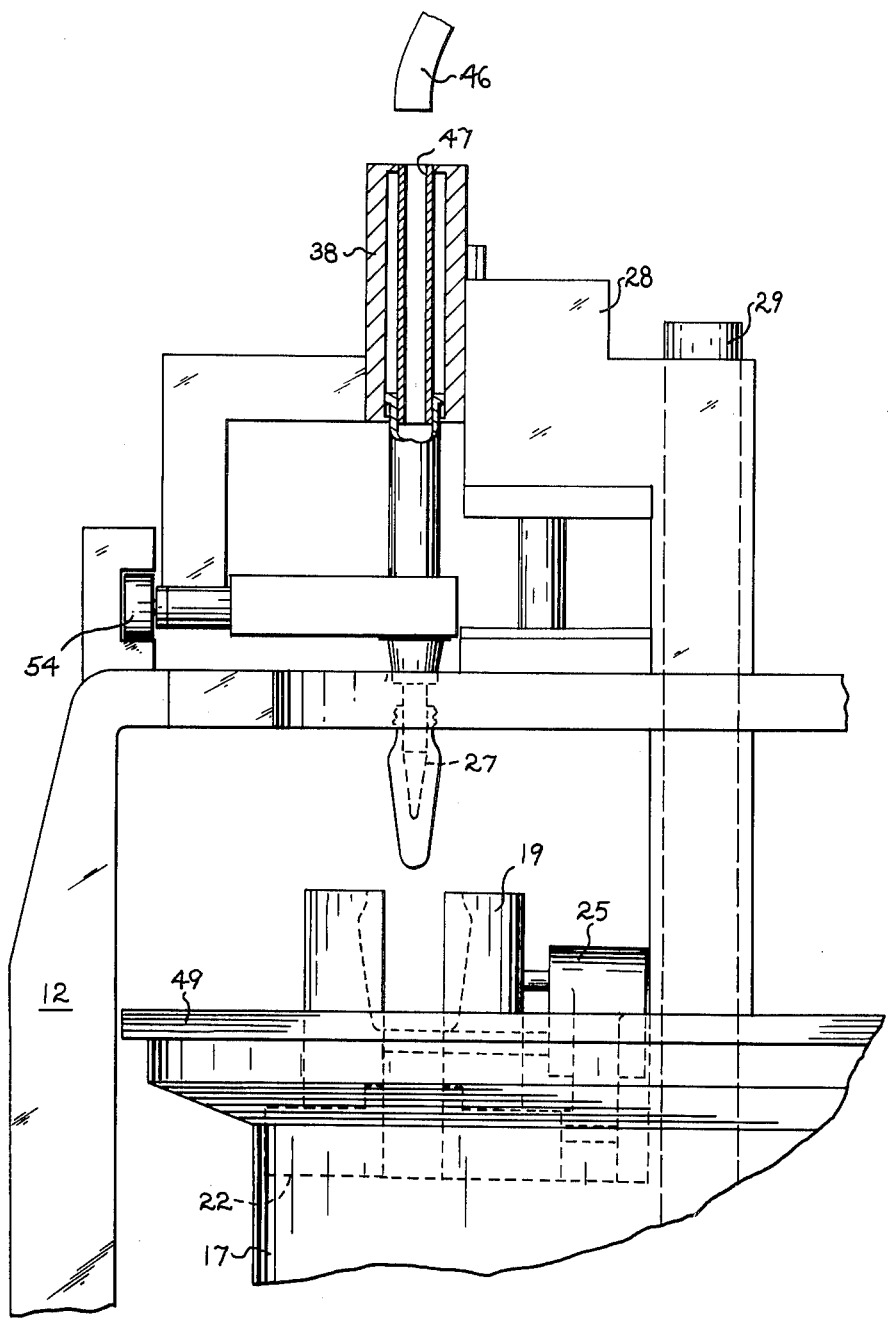
FIG. 2b is a partial elevational view of the parison forming mechanism similar to FIG. 2a with the mechanism at a later time in the parison forming cycle.

It should be pointed out that the parison mold 19 is mounted on a support 22 which is shown within a recess 23 of the drum 17 and this support 22 is mounted on the upper end of a piston rod 24 which extends downwardly into the drum-like member 17. The piston rod 24 is reciprocated by means (not shown) provided in the drum-like member 17. In this manner the parison mold 19 may be raised into contact with the neck molds 14 and 15. The parison mold 19 is opened and closed by the operation of a fluid motor 25 mounted on one mold half and connected to the other mold half. In this manner, after the parisons are formed within the parison mold 19, the mold may be opened and then lowered so that the mold will clear the bottom of the parisons as illustrated in FIG. 2b. At this time the drum 17 indexes approximately 120° in a clockwise direction and carries the parison mold 19 to a position in alignment with the next set of neck molds.

The split blow molds 20 are also provided with mechanism (not shown) for raising them into contact with the neck molds, and retracting them after completion of the blowing operation. The blow molds 20 are opened and closed in a similar manner as the parison mold 19 by a fluid motor 26 connected thereto.

Figure 2C:
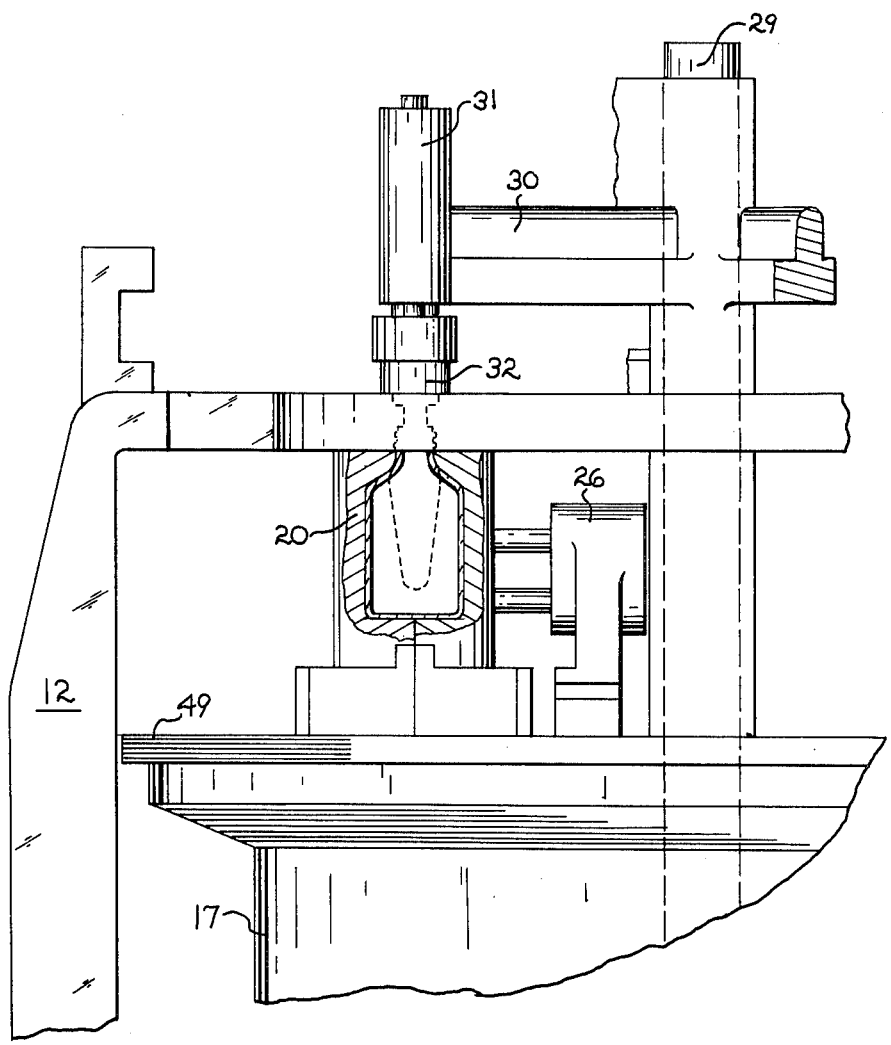
FIG. 2c is a partial elevational view of the blowing mechanism of the left-hand machine illustrated in FIG. 1.

Thus it can be seen that upon the movement of the blow molds into position below neck rings which contain suspended parisons, the actuation of the raising mechanism will move the blow molds vertically into surrounding relationship with respect to the parisons and the fluid motors 26 will be actuated to close the blow molds about the parisons as illustrated in FIG. 2c. After the parisons have been expanded within the blow molds, the fluid motor 26 is reversed to open the blow molds and the blow molds are lowered sufficiently to clear the bottom of the blown ware which is still retained within the neck rings 15 and 16. Indexing of the drum 17 will move the blow molds 20 into vertical alignment with parisons that are pendant from the next set of neck molds.

The pressing of the parisons is accomplished within the parison mold 19 by a downward movement of a pair of plungers 27 through the neck molds 15 and 16 and into the cavities formed in the parison mold 19. The plungers 27 are mounted on a laterally extending arm 28 which has its inner end connected to a vertically extending post 29. The post 29, which is connected to the drum 17, extends through the disc-like member 13 and is rotatable with respect thereto. The arm 28 which serves as the support for the plungers 27 and their actuating mechanism is rotatable with the drum 17 and is always positioned such that the plungers are in vertical alignment with the parison mold 19 except during mold charging.

The post 29 has a second arm 30 connected thereto which extends radially outward from the post and has a blow head 31 mounted on the end thereof (see FIG. 2c). The blow head 31 is located vertically above the blow molds and in the particular example shown on the drawings, is provided with two members 32 and 33 which seat over the two neck molds. The blow head 31 contains a pair of fluid motors which, when actuated, will move the members 32 and 33 vertically downward into position overlying the neck molds. When in this lowered position, as specifically shown on machine 8, of FIG. 1, the members 32 and 33 serve to apply the blowing air to the interior of the parisons which are blown to final shape within the blow molds as illustrated in FIG. 2c. A third arm 34 extends radially outward from the post 29 and carries, at its extending end, a finish cooling mechanism 35. The finish cooling mechanism 35 takes the form of a pair of reciprocating piston type motors to which disc-like finish cooling nozzle members 36 and 37 are attached. The nozzles are adapted to be lowered into the neck of the ware at the same time that the jar lowering mechanism 21 is elevated. With the jar lowering mechanism in elevated position, the neck mold halves 15 and 16 are opened, releasing the finished ware to the upper surface of the mechanism 21. At the same time the nozzles 36 and 37, which are extending into the neck portion of the bottles, will apply cooling air to the internal surfaces of the bottle necks.

As previously pointed out the post 29 rotates or indexes with the drum 17 and thus the molding members, for example, the plungers and parison molds, the blow head or blow molds, and the finish cooling and ware lowering mechanism, will always be positioned in fixed relation to each other. The arm 28 which supports the plunger mechanism also serves as the support for the mold charge guiding mechanism 38.

The mold charges 39 as they are delivered to the machines, are dropped from the usual double-orifice feeder (not shown) and fall through a pair of vertical funnels 40. After the mold charges pass through the funnels, they are distributed by gob distributing mechanism generally designated as 41. The distributor mechanism 41 (shown schematically on FIG. 1) takes the form of a disc-like member 42 having a plurality of pairs of gob deflectors 43 extending therethrough, of which only a single pair is shown on FIG. 1. Each of the openings 44 in the disc-like member 42 will have a specifically oriented gob deflector positioned therein. The disc-like member 42 is rotatable about its center so that upon being indexed, will present successive pairs of openings 44 beneath the funnels 40.

As specifically shown in FIG. 1, the deflectors 43 will guide mold charges into troughs 45 which will guide the charges in an inclined path into a second pair of deflectors 46. The deflectors 46 will cause the mold charges to change their direction of movement from an inclined path to a vertical path and deliver the mold charges to the upper open ends of a pair of funnels 47 which are carried by the mold charge guiding mechanism 38 as illustrated in FIG. 2a.

It can clearly be seen that there are three sets of mold charge guiding troughs and deflectors for each machine. The deflectors 46 will have their lower ends positioned in vertical alignment with the three sets of neck molds provided on each machine. In this manner the mold charges may be successively fed to the parison molds 19 as they are moved into parison forming position with respect to the three sets of neck molds on each machine.

Figure 2D:
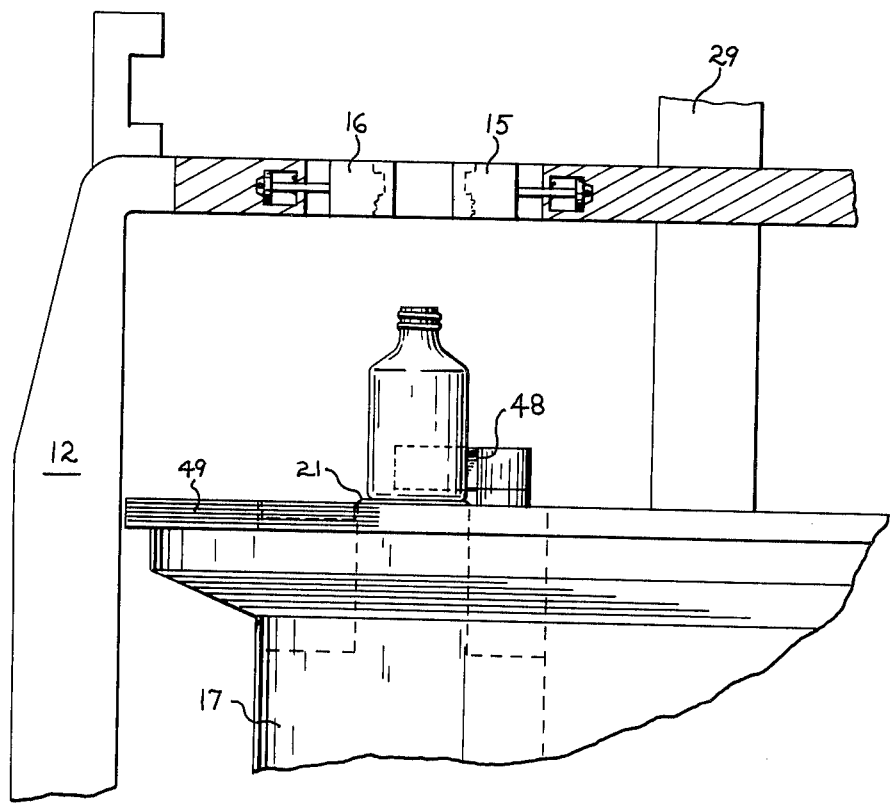
FIG. 2d is a partial elevational view of the bottle take-out mechanism of the left-hand machine illustrated in FIG. 1.

As can readily be seen, the machine 8 is in the forming position wherein mold charges are being pressed in the parison mold 19, parisons are being blown in the blow molds 20 and finished bottles are being removed at the third station of the machine where the neck mold halves 15 and 16 are shown open. The drum 17 on the machine 8 rotates in a counter-clockwise direction and after the forming functions are performed with the mechanism in the position shown, the parison molds 19 will open and be lowered with respect to the neck molds, the blow mold will be opened and lowered with respect to the neck molds, and the jar lowering mechanism 21 will move downward to the position shown in FIG. 2d and the formed bottles are swept off of the lowering mechanism by means of a sweep-out arm 48.

The swept out bottles are moved onto an annular conveyor 49 which is moving in a clockwise direction. The conveyor carries the ware in a circular path to a position adjacent a similar conveyor 50 on the machine 9. The conveyor 50 is moving in a counter-clockwise direction, thus delivering its bottles to a point adjacent the conveyor 49 of the machine 8. At this point a continuously rotating feed screw mechanism 51 moves the bottles along in a horizontal path onto the end of a continuously moving belt conveyor 52. In this manner the finished ware is removed from the two machines and delivered to the conveyor 52 in spaced relationship. The conveyor will carry the bottles to an annealing lehr.

The support members 12, adjacent their top edges are provided with horizontal grooves 53 within which a roller 54, carried by an arm 28, is adapted to be moved. This is to provide added rigidity to the arm 38 during the pressing operation when relatively high forces are involved. Parisons are pressed at each of the three positions of the neck mold halves 15 and 16 and therefore, it is necessary to provide this additional support at each of the three locations of the neck molds.

Referring now to FIGS. 4 to 7, there is disclosed a second embodiment of the invention in which the molds and plunger mechanism are shifted laterally rather than indexed about a central axis as disclosed above with respect to the embodiment shown in FIG. 1.

In general, it may be pointed out that in this second embodiment, only a pair of neck molds remain stationary during the normal operating cycle of the mechanism and that the mold equipment is mounted to shift as a unit relative thereto. A single parison forming mold unit is utilized for forming parisons, alternately, at the two fixed positions of the neck molds and a pair of blow molding units, one individual to each set of neck molds, are alternately shifted into and out of position in vertical alignment with the neck molds.

The main supporting base 60 has a dove-tail slot 61 formed in the upper surface thereof within which a slidable member 62 having a dove-tail portion 63 is adapted to slide. The member 62 has two upstanding posts 64 and 65 mounted adjacent the ends thereof which serve as supports for a pair of blow molds 66 and 67. The posts 64 and 65 also serve as the supporting members for a pair of blow heads 68 and 69, it being understood that the blow heads are vertically shiftable on the posts by mechanism not shown. The blow molds are split molds which are hingedly mounted on the supporting posts 64 and 65. An upright frame member formed of posts 70 extending upwardly from the slidable member 62 has a portion 71 which extends between the posts and is parallel to but spaced above the member 62. This horizontal portion 71 serves as a support for a plunger operating mechanism 72. The machinsm 72 has two vertically extending plungers therefrom to which are connected pressing plungers 74. Immediately below the plungers 74 and in vertical alignment therewith is a double cavity parison mold 75. The parison mold 75 is mounted on the upper end of a shaft 76 which extends into an opening in the slidable member 62 and has at its lower end a piston head 77 which is reciprocated within the member 62. Actuation of the piston by the application of hydraulic fluid on either side thereof will raise or lower the parison mold 75 into and out of parison forming position so that after the parisons are formed, the mold may be lowered to permit shifting of the parison mold into alignment with a second pair of neck molds located at the second forming position.

As best shown in FIGS. 6 and 7, stationary neck forming molds 78 and 79 are connected to supporting arms 80 and 81 which are formed integral with the supporting base 60. Thus it can be seen that the neck molds 78 and 79 remain stationary while the plunger mechanism 72, parison mold 75, and the blow molds 66 and 67 are laterally shiftable as a body relative thereto. The blow molds 66 and 67 have open bottoms which are closed by vertically reciprocable bottom plates 82 and 83. The bottom plates, which are composed of two bottom closing members 84, associated with each blow mold, are mounted on shafts 85 and 86 which extend into openings formed in the members 62. The shafts 85 and 83 have piston heads 87 and 88 on the lower ends thereof. The bottom closing members 84 are lowered after the bottles have been completely blown within the blow mold and the arms of the blow molds have been opened. Opening of the neck molds will then release the neck portion of the formed bottles and permit the bottles to be lowered by the closing members which support them at their bottoms.

Turning now to FIGS. 4 and 5, the operation of this second embodiment of the invention is as follows:

With the apparatus in the position shown in FIG. 4, two parisons are being pressed within the parison mold 75 by the movement of the plungers 74 through the neck mold 78 while at the same time the blow mold 66 is closed about a pair of previously formed parisons held in the neck mold 79. When the blow head 68 is moved vertically downward into contact with the top surface of the neck mold 79, blow air is turned on and the parisons are blown into the shape defined by the cavities within the blow molds 66. Previously formed bottles have already been removed from the bottom closure members 84 of the bottom plate mechanism 82.

After the parisons are completely formed in the location of the neck mold 78, the plunger operating mechanism is reversed to raise the plungers 74 vertically upward an amount sufficient to clear the tops of the neck molds 78. Concurrently therewith, the parison mold 75 is lowered an amount sufficient for the top of the parison mold to clear the bottom of the formed parison, thus leaving the parisons in a pendant form with the neck portions confined in the neck molds 78. This stripping of the parisons from the mold 75 is carried out at the same time that the blow head 68 is raised to clear the neck molds 79 and the blow mold 66 is opened. After the blow molds have opened, the neck mold 79 is opened an amount sufficient to clear the closure attaching portion of the necks of the formed bottles while at the same time the bottom plate mechanism 83 is lowered. Thus the formed bottles will be completely supported by the bottom closure members 84 of the bottom plate mechanism 83. With the above operations completed, the slidable member 62 is shifted to the right to the position shown in FIG. 5.

With the molding mechanism in the position shown in FIG. 5, the blow mold 67 will be closed about the parisons which are supported by the neck mold 78 and the bottom plate mechanism 82 will raise the bottom closure members 84 into engagement with the bottom of the blow mold 67. With the blow molds 67 closed and the bottom plate 82 raised, the blow head 69 is shifted vertically downward into blowing position and the parisons will be expanded into final bottle form. At the same time that the blowing of the bottles is occurring in the blow mold 67, a second pair of mold charges will have been fed to the parison mold 75 which is now raised into contact with the bottom surface of the neck mold 79 thus forming a complete parison forming mold. The plunger mechanism 72 is actuated to lower the plunger 74 into pressing relationship with respect to the mold charges contained within the parison mold 75 and a second pair of parisons will be formed. While these forming operations are taking place, the previously blown ware is removed from the bottom closure members 84 of the bottom plate mechanism 83.

Thus it can be seen that applicant has provided a glass forming method and apparatus for carrying out this method in which parisons are formed and blown into final form without being moved during their formation and the glass is not transferred except after being completely blown and then only when supported by bottom supporting member, such as 84 or 21 which conforms to the contour of the entire bottom wall surface of the container. Therefore, hollow glass containers are formed in an overlapping cycle of operation and without subjecting the glass, when in its more fluid condition, to lateral stresses which are normally encountered in glass forming methods which require transfer of the parison from a pressing station to a blow station.

While applicant has particularly described the invention with respect to the press and blow cycle of bottle formation, it should be understood that a blow and blow cycle of operation could be utilized wherein the parisons are formed by the familiar settle blow and counter blow process and then finish blown in the blow molds.

The same principles of the invention, relative to not moving the parisons after being formed, would be equally applicable in such a process.

Various modifications may be resorted to within the spirit and scope of the appended claims.

I claim:

1. Apparatus for shaping hollow glass articles, comprising a rotatable table, means for mounting a parison mold on said table for rotation therewith, means for mounting a blow mold on said table for rotation therewith, means for mounting a vertically reciprocable dead plate and sweep out arm on said table for rotation therewith, said blow mold, parison mold and dead plate being equi-spaced circumferentially of said table, an upper support structure carried by said table, a plunger and plunger actuating mechanism carried by said upper support structure in vertical alignment with said parison mold, a blow head carried by said upper support structure in vertical alignment with said blow mold, a finish cooling head carried by said upper support structure in vertical alignment with said dead plate, means fixedly supporting a neck mold intermediate the table and said upper support structure, means for indexing said table and upper support structure relative to said fixed neck mold whereby a parison is formed, blown to final form and removed from the forming machine without transfer of the glass during forming.

2. The apparatus as defined in claim 1 wherein said parison mold is a split mold, means for opening and closing said parison mold and means for raising and lowering said parison mold with respect to said neck mold and table.

3. Apparatus as defined in claim 1 wherein said blow mold is a split mold, means for opening and closing said blow mold and means for raising and lowering said blow mold with respect to said neck mold.

4. Apparatus for shaping hollow glass articles comprising a rotatable table, a dual cavity parison mold mounted on said table, means for raising and lowering said parison mold, a dual cavitied blow mold mounted on said table, means for raising and lowering said blow mold, a vertically reciprocable dead plate mechanism mounted on said table, means for raising and lowering said dead plate mechanism, an upper support structure mounted above said table and rotatable therewith, plunger mechanism mounted on said upper support structure, blow head mechanism mounted on said upper support structure, and finish cooling mechanism mounted on said upper support structure, said plunger mechanism and parison mold being positioned in vertical alignment, said blow mold and blow head mechanism being mounted in vertical alignment and said dead plate mechanism and said finish cooling mechanism being mounted in vertical alignment, three sets of split neck molds carried by said forming machine and positioned intermediate said table and said upper support structure, a circular conveyor positioned adjacent the outer periphery of said table, said conveyor moving in a direction opposite to the rotational movement of said table whereby parisons are formed, blown and swept out onto said conveyor from each of said three neck mold positions.

5. Apparatus for forming hollow glass articles comprising a base, a mold supporting member mounted for horizontal sliding movement relative to said base, a parison mold mounted on said supporting member, means for raising and lowering said parison mold, a vertically movable plunger mounted on said supporting member in vertical alignment with said parison mold, a pair of spaced apart neck molds mounted on said base and spaced vertically thereabove, a pair of spaced apart blow molds mounted on said support member, and means for alternately shifting said supporting member whereby a parison is formed at one neck mold location while a bottle is being blown at the other neck mold location.

6. Apparatus for forming hollow glass articles comprising a base, a support member mounted for horizontal sliding movement relative to said base, a pair of spaced apart neck molds mounted above said base in spaced apart relationship, said neck molds being mounted on said base in fixed position, a parison forming means carried by said support member adapted to cooperate alternatively with said neck molds to form parisons, and a pair of laterally spaced blow molding means carried by said member on opposite sides of said parison forming means, whereby shifting of said support member relative to said base will place the parison forming means in alignment with one of said neck molds while one of said blow molds is placed in alignment with the other neck mold and the other blow mold is moved to a position where the formed article may be removed.

7. Apparatus for forming hollow glass articles comprising a base, a mold supporting member mounted for horizontal sliding movement relative to said base, a double cavity parison mold mounted on said support member, means for raising and lowering said parison mold, a pair of vertically movable plungers mounted on said member and positioned in axial alignment with mold cavities, two sets of double cavitied neck molds mounted above said base, said neck mold sets being spaced apart and having their cavities in a common vertical plane, a pair of double cavitied blow molds positioned on opposite sides of said parison mold and mounted on said support member, said vertical plane also passing through the axes of the cavities of the parison mold, and the blow molds, whereby horizontal reciprocation of said support member will place the parison mold and plungers in axial alignment with the neck mold sets alternatively.

8. Apparatus for successively forming hollow glass articles comprising a base, a plurality of spaced-apart neck molds mounted on said base and fixed relative thereto, a movable member carried by said base, a parison mold mounted on said movable member, means connected to said parison mold for reciprocating said mold in a vertical direction, vertically reciprocable parison shaping means mounted on said movable member vertically above said parison mold, blow molding means mounted on said movable member, a vertically reciprocable blow head mounted on said movable member in overlying coaxial relationship with respect to said blow molding means, said blow molding means and parison mold being mounted on said movable member in spaced-apart relationship an amount equal to the spacing between said fixed neck molds and means connected to said movable member for shifting said member to successively place, first the parison mold and then the blow molding means in glass forming relationship with respect to said fixed neck molds whereby parisons are formed and blown into hollow glass articles while retained in the fixed neck molds.

References Cited by the Examiner

UNITED STATES PATENTS 1,601,836  10/1926  Stenhouse _____ 65—231

FOREIGN PATENTS 781,802  8/1957  Great Britain.
499,540  11/1954  Italy.

DONALL H. SYLVESTER, *Primary Examiner.*